(12) United States Patent
Heubeck et al.

(10) Patent No.: US 10,920,734 B2
(45) Date of Patent: Feb. 16, 2021

(54) IGNITION DEVICE, INTERNAL COMBUSTION ENGINE AND METHOD FOR ITS OPERATION

(71) Applicant: PRUEFREX engineering e motion GmbH & Co. KG, Cadolzburg (DE)

(72) Inventors: Jochen Heubeck, Langenzenn (DE); Marek Lajda, Fuerth (DE)

(73) Assignee: PRUEFREX engineering e motion GmbH & Co. KG, Cadolzburg (DE)

( * ) Notice: Subject to any disclaimer, the term of this patent is extended or adjusted under 35 U.S.C. 154(b) by 1 day.

(21) Appl. No.: 16/404,081

(22) Filed: May 6, 2019

(65) Prior Publication Data

US 2019/0338746 A1 Nov. 7, 2019

(30) Foreign Application Priority Data

May 4, 2018 (DE) ..................... 10 2018 206 991.3

(51) Int. Cl.
| | | |
|---|---|---|
| F02P 1/02 | (2006.01) | |
| F02P 3/05 | (2006.01) | |
| F02P 9/00 | (2006.01) | |
| F02P 15/12 | (2006.01) | |
| F02P 3/08 | (2006.01) | |
| F02D 41/20 | (2006.01) | |

(52) U.S. Cl.
CPC ................... *F02P 1/02* (2013.01); *F02P 3/05* (2013.01); *F02P 9/002* (2013.01); *F02P 15/12* (2013.01); *F02D 2041/2006* (2013.01); *F02P 3/0876* (2013.01)

(58) Field of Classification Search
CPC ...... F02P 15/12; F02P 1/02; F02P 1/08; F02P 3/04; F02P 3/05; F02P 3/08; F02P 5/1502; F02P 9/002
See application file for complete search history.

(56) References Cited

U.S. PATENT DOCUMENTS

| | | |
|---|---|---|
| 5,161,496 A | 11/1992 | Matsushima et al. |
| 9,841,355 B2 | 12/2017 | Kiessling et al. |
| 9,932,935 B2 | 4/2018 | Lajda |
| 2011/0006693 A1 | 1/2011 | Olsson |

(Continued)

FOREIGN PATENT DOCUMENTS

| | | |
|---|---|---|
| DE | 69403420 T2 | 9/1997 |
| DE | 102013020739 B3 | 4/2015 |

(Continued)

*Primary Examiner* — Carl C Staubach
(74) *Attorney, Agent, or Firm* — Muncy, Geissler, Olds & Lowe, P.C.

(57) ABSTRACT

An ignition device for an internal combustion engine with a charging coil, in particular disposed on a yoke core, with a starter wheel to induce a charging voltage in the charging coil by its rotation, with a first energy store which is connected to the charging coil via a rectifier, as well as with an electrical load which for its power supply, in particular during the starting process of the internal combustion engine is connected to a second energy store, wherein the second energy store is connected to the first energy store via a voltage converter. Furthermore, the invention relates to an internal combustion engine with such an ignition device and a method for its operation.

17 Claims, 5 Drawing Sheets

(56) References Cited

U.S. PATENT DOCUMENTS

| | | | | |
|---|---|---|---|---|
| 2011/0132283 A1* | 6/2011 | Czekala | ............... | F02P 5/1516 |
| | | | | 123/3 |
| 2012/0013262 A1* | 1/2012 | Nakano | .................. | F02P 9/007 |
| | | | | 315/209 CD |
| 2012/0060804 A1* | 3/2012 | Aida | ....................... | F02P 3/09 |
| | | | | 123/597 |
| 2013/0264868 A1* | 10/2013 | Higaki | ................. | H02J 7/0013 |
| | | | | 307/10.1 |
| 2015/0160095 A1* | 6/2015 | Kiessling | ............... | F02P 1/086 |
| | | | | 73/114.62 |
| 2015/0352968 A1* | 12/2015 | Date | .................... | B60L 3/0046 |
| | | | | 307/10.1 |
| 2018/0283345 A1* | 10/2018 | Koenen | ................ | F02P 5/1558 |

FOREIGN PATENT DOCUMENTS

| | | |
|---|---|---|
| DE | 102014003297 A1 | 9/2015 |
| WO | WO2013035108 A1 | 3/2013 |

\* cited by examiner

IGNITION DEVICE, INTERNAL COMBUSTION ENGINE AND METHOD FOR ITS OPERATION

This nonprovisional application claims priority under 35 U.S.C. § 119(a) to German Patent Application No. 10 2018 206 991.3, which was filed in Germany on May 4, 2018, and which is herein incorporated by reference.

BACKGROUND OF THE INVENTION

Field of the Invention

The present invention relates to an ignition device for an internal combustion engine, having a charging coil for providing an induced charging voltage and having an electrical load. Furthermore, the invention relates to an internal combustion engine having such an ignition device as well as a method for operating such an internal combustion engine.

Description of the Background Art

An implement that is to be operated substantially independently or over a relatively long period of time, such as a chainsaw or a lawnmower, is usually driven by means of an internal combustion engine. In this case, the internal combustion engine is in particular designed as a low power engine, wherein a low power engine in particular is understood to be a two-stroke engine with a capacity up to 350 $cm^3$ and/or a four-stroke engine with one or two cylinders and a capacity up to 1000 $cm^3$.

For the operation of such an internal combustion engine, an ignition system (ignition device) is provided for generating an ignition spark. For example, from DE 10 2014 003 297 B4, which corresponds to U.S. Pat. No. 9,932,935, which is incorporated herein by reference, an ignition system of an internal combustion engine is known. This has a charging coil arranged on a yoke core, in which a voltage is induced during a rotation of the flywheel. With this voltage, an energy store (energy store element) designed as an ignition capacitor is charged via a rectifier. The energy store is connected to an ignition coil (ignition transformer) such that the energy store, in a corresponding circuit of an ignition switch connected to its input, discharges through the ignition coil, generating an ignition spark there.

In addition, DE 10 2013 020 739 B3, which corresponds to U.S. Pat. No. 9,841,355, which is incorporated herein by reference, discloses an ignition device of which the flywheel has two permanent magnets.

To supply an electrical load with (electrical) energy during the starting process (start-up process) of the conventional internal combustion engine, for example, a battery or a generator are used. However, a disadvantage can be that the battery may be drained, in particular after the implement has been stored for a relatively long time. In addition, the capacity and/or performance of the battery decreases due to aging processes. Due to the comparatively low speeds of the flywheel occurring during the starting process, the generator provides only a comparatively low voltage and/or power for the electrical load. Because of this, it is not possible to supply power to a load with a comparatively high energy demand, for example, a fuel-injection valve.

SUMMARY OF THE INVENTION

It is therefore an object of the present invention to provide a suitable ignition device for an internal combustion engine, which also allows for the operation of an electrical load with a comparatively high energy demand even during the starting operation of the internal combustion engine. In particular, even at low speeds, i.e., for example, during the starting operation of the internal combustion engine, safe operation of the load is to be achieved. Further to be provided are an internal combustion engine with such an ignition device and a method for its operation.

In an exemplary embodiment, an ignition device for an internal combustion engine includes a charging coil for providing an induced charging voltage due to the rotational movement (rotation) of a starter wheel. In other words, the charging voltage in the charging coil is induced due to the rotational movement of the starter wheel. The charging coil can be arranged on a yoke core. In addition, the ignition device comprises a first energy store which is connected to the charging coil through a rectifier by means of the induced charging voltage for the purpose of charging. In this case, the rectifier may be a diode, a half bridge rectifier or a full bridge rectifier. In an alternative embodiment, the ignition device comprises a generator instead of the charging coil. In that case, the following embodiments apply analogously.

The ignition device further includes an electrical load, which is connected to a second energy store to supply it with power, especially during the starting process (start-up process, cranking up) of the combustion engine at low speeds. In this case, the second energy store is connected via a voltage converter to the first energy store.

The electrical load is, for example, an ignition transformer often also called an ignition coil. Alternatively, or additionally, however, the ignition device according to the invention also makes it possible to supply an electrical load with a comparatively high energy demand, such as a fuel-injection valve, with sufficient energy for its operation, in particular during the starting operation of the internal combustion engine.

The invention is based on the fact that under certain operating conditions or requirements, the first energy store charged by means of the induced charging voltage does not provide sufficient energy and/or a sufficiently high voltage for commissioning an electrical load with a comparatively high energy demand or multiple electrical loads during the starting process of the internal combustion engine.

The underlying rationale of the invention, in particular during the starting phase (the start-up process) of the internal combustion engine, when rpms are typically low, is to increase the (charging) voltage of the first energy store in order to provide a comparatively high voltage and thus sufficient energy for the electrical load or loads. For this purpose, a voltage converter is particularly suitable, which is connected on the input side to the first energy store. The voltage applied to the voltage converter on the input side is then changed (converted, in particular increased) by means of the voltage converter into a larger voltage applied to its output. The ratio between the voltage applied to the output and the voltage present at the input is designated below as the transfer factor.

Thus, at the input of the second energy store, which is connected at the output of the voltage converter, a voltage is applied which is greater than the voltage provided by the first energy store. The second energy store is thus charged at a comparatively high voltage. As a consequence, it is also advantageously possible for the second energy store to provide a higher voltage on the output side than the first energy store. For this purpose, according to a suitable embodiment, the first energy store and/or the second energy store are a capacitor.

Conveniently, the second energy store has a larger storage capacity for an amount of energy than the first energy store, so that even a load with a relatively high energy demand can be and also is supplied with energy.

For example, the voltage converter has a coil or inductance which can be switched to ground via a switch, in particular a semiconductor switch such as a (bipolar) transistor. When the switch is closed, the voltage provided by the first energy store is applied to the coil so that a corresponding current flows in the coil, and energy, which is to be transmitted to the second energy store, is cached in the form of a magnetic field produced by means of the coil. If the switch is opened, a relatively large voltage is induced, by means of which the second energy store, or by means of which an output-side charging capacitor of the voltage converter is charged.

The voltage converter can be formed as an up-converter (boost converter, step-up converter) of which the output voltage is greater than its input voltage. In summary, therefore, its input is expediently connected with the first energy store and its output is expediently connected with the second energy store.

The ignition device can have a control unit (control device), which is connected to a control input of the electrical load. The control unit is, for example, a microprocessor, an ASIC (application specific integrated circuit) or an FPGA (field programmable gate array). The control unit further measures the energy provided by the second energy store or an energy value representing this. Preferably, the electrical load is first switched (activated) once the energy provided in the second energy store or the energy exceeds a threshold value.

Additionally, or alternatively, the control unit measures the voltage provided by the first energy store, i.e., the voltage applied to the input of the voltage converter. Preferably, the voltage converter is activated by the control device as a function of the voltage provided by the first energy store.

For example, the control input can be formed by a switch or by a suitable circuit or comprises these, wherein the switch or the circuit may be integrated in the electrical load or alternatively be connected in the corresponding current path as a separate component.

An internal combustion engine can comprises an ignition device in one of the variations described above. Furthermore, the internal combustion engine comprises a starter wheel. The free ends of the yoke core expediently face the starter wheel. In particular, the yoke core is U-shaped, i.e., two-legged, or E-shaped, i.e., three-legged. In this case, an air gap is formed between the corresponding free end (leg) and the starter wheel.

The starter wheel can be embodied as a (magnetic) flywheel having a number of magnets. In this case, the number of magnets is greater than or equal to one. Upon rotation of the flywheel, the magnetic poles (magnet poles) of one of the magnets first move past the first free end and subsequently past the second free end of the yoke core. In this case, the yoke core is pervaded by the magnetic flux of the corresponding magnet of the flywheel via the air gap, and a magnetic circuit is realized. Preferably, in each case pole shoes are additionally arranged on the poles of the magnet or magnets to facilitate the magnetic circuit. The magnetic flux change resulting from the fact that the magnet is passing by in rotation, induces the charging voltage in the charging coil arranged in the yoke core. Here, the charging voltage in particular has a sequence of positive and negative half waves, whose maxima and minima (peak values, extreme values, voltage peaks) correlate with specific angular positions of the flywheel.

The polarity of one of the magnets, can be referred to below as a magnetic position sensor, of the flywheel is oriented in a direction of rotation of the flywheel and the polarity of the other magnets is oriented against this direction of rotation. In other words, in a circumferential direction of the flywheel, the magnetic north pole (N) and the magnetic south pole (S) of one of the magnets are arranged one behind the other, but the magnetic north pole and the magnetic south pole of the other magnets are arranged one behind the another in each case opposite the circumferential direction or vice versa. When passing the magnet with its polarity pointing in the direction of rotation, as compared to passing the magnets with their polarity opposite the direction of rotation, the half waves of the charging voltage have a reversed sign. By means of an evaluation of the length of time of the charging coil voltage, in particular by means of the control unit which for this purpose measures the charging voltage, this advantageously allows for an (angular) positioning of the flywheel or of a crankshaft coupled with the flywheel, in particular in a torque-proof manner. An additional sensor or an additional measuring element for determining the position or a (rotational) speed (rotational speed sensor) of the starter wheel derived therefrom is thus not necessary, so that advantageously costs are reduced.

The starter wheel can be designed as a gear, and a magnet can be integrated in the yoke core. If during rotation in each case one tooth of the gear is aligned in terms of radial direction with the free ends of the yoke core, the magnetic circuit is closed via the air gap and the gear. However, if the free ends of the yoke core are facing (are opposite) a gap formed between the teeth of the gear, the magnetic circuit is interrupted due to the then comparatively large air gap. Upon rotation of the gear, the magnetic flux thus changes due to the charging coil so that the charging voltage is induced. For example, the teeth of the gear are not arranged equidistant from each other so that an (angular) positioning of the flywheel can be determined from the length of time of the induction voltage, in particular by means of the distance of the peak values to each other.

During start-up, the starter wheel is set in rotation, for example, by means of manual pulling of a starter cord suitably coupled with the starter wheel. The associated speeds of the starter wheel (at start-up) are low in comparison to the speeds that are present when the combustion engine is operated. Preferably, the starter wheel, the charging coil, the rectifier and/or the first energy store are designed such that with the speeds occurring at fire up (start-up) of the combustion engine, the largest possible amount of energy is stored in the first energy store. For example, the coil form, the winding counts of the charging coil, the diameter of the starter wheel embodied as a flywheel, the magnetization of the magnets of the latter and/or the number of the magnets thereof are selected accordingly.

Due to this, at speeds in the working range (operating range) of the internal combustion engine, a comparatively high charging voltage can be induced (generated). In order to prevent damage to the ignition device, in particular to the first energy store, a voltage limiter (voltage limiting device) is connected between the charging coil and the first energy store according to an advantageous embodiment of the ignition device. Consequently, the induced charging voltage, which is supplied to the input side of the first energy store, is limited at the first energy store. The voltage limiter, for example, may be a varistor, a Zener diode, a suppressor diode or a voltage limiting circuit.

The charging coil and the voltage limiter can be arranged in a first module, and at least the first energy store, preferably the first and the second energy store, and the rectifier and the voltage converter and/or the control unit are arranged in a second module, which is separated from the first module. In other words, the two modules are not connected. A housing comprising the respective module is therefore separate from the housing of the other module. For example, the electrical load is also disposed in the second module. In summary, the ignition device has a modular construction. In this case, due to the arrangement of the charging coil around the yoke core, the first module is expediently also arranged on the yoke core.

Advantageously, a heat sink can be used to cool the overvoltage protection can thus be made or adapted comparatively easily. In particular, the heat sink is or can be embodied comparatively small, so that space and cost are saved.

For example, air vanes can be arranged or attached to the starter wheel, by means of which a draft (air flow) is generated upon rotation of the starter wheel, which is guided around a cylinder of the combustion engine for purposes of cooling. The module arranged on the yoke core, as compared to an ignition device which is formed from only a single module, is relatively small and thus comparatively compact. Advantageously, because of this, the draft produced for cooling is obstructed only to a comparatively small degree.

Further, a connector (plug element) can be provided on a housing, comprising the corresponding module to which the components arranged in this module are connected. For example, the two modules are connected by means of a cable, wherein a cable used for this purpose, in particular its cable length, is adapted to the arrangement of the modules in the internal combustion engine.

If the ignition device is also to be used in other models of combustion engines, it may be necessary to change (adapt) the ignition device, in particular the charging coil and/or the starter wheel. Advantageously, due to the modular structure of the ignition device, this change is comparatively easy. Thus, in particular, the second module can be used for a number of different models of the internal combustion engine without further changes, which has a cost-saving effect in production.

Furthermore, it is possible to use the second module without any changes, both for an internal combustion engine with a flywheel as a starter wheel as well as for an internal combustion engine with a gear as a starter wheel. In summary, due to the structural separation, the second module can be used for a plurality of different internal combustion engine models, consequently advantageously simplifying production and saving costs.

In a method for operating an internal combustion engine with an ignition device, which is designed in particular as one of the variations described above, a first energy store is charged by means of a charging voltage induced in a charging coil, in particular via a rectifier. According to the method, the voltage provided by the first energy store is measured, in particular due to its charging by means of the induced charging voltage. For this purpose, for example, a control unit is used. Charging of a second energy store connected to the first energy store via a voltage converter takes place as a function of the measured voltage, that is to say the voltage provided by the first energy store. In this case, the measured voltage or the measured voltage value suitably corresponds to the input voltage of the voltage converter.

As a function of the charging of the second energy store, the transmission of an energy, which corresponds to the induction taking place in the charging coil, to the second energy store is improved by the voltage provided by the first energy store and routed to the voltage converter. In other words, the efficiency of the energy transmission to the second energy store is improved. Consequently, the second energy store provides sufficient energy in a particularly time-saving manner for the operation of an electrical load even at low engine speeds of the combustion engine.

For this purpose, the impedance of the circuit formed from the charging coil and the first energy store, which corresponds in particular to the impedance of the first energy store embodied as a capacitor, and the impedance of the voltage converter, in particular of an inductance or of the coil, as long as the voltage converter is formed as an up-converter, are matched to one another. According to a suitable embodiment, in order to match the impedances, the voltage provided by the first energy store, i.e., applied thereto, is compared to a voltage threshold value. The charging of the second energy store via the voltage converter is suspended as long as or when the voltage provided by the first energy store, i.e., the measured voltage, falls below the voltage threshold. In particular, this way the impedance of the circuit that is formed from the charging coil and the first energy store is set in accordance with the voltage threshold.

In this case, for example, the control unit is used to compare the voltage threshold with the voltage supplied by the first energy store. Alternatively, the voltage converter has a switching element or a (comparator) circuit. In particular, for suspending the charging of the second energy store, the voltage converter is triggered to an off-state. In other words, the transfer factor of the voltage converter, is reduced preferably to zero. Consequently, when the voltage converter is in the off-state, its input voltage is not increased to a larger output voltage.

For example, in a voltage converter designed as a step-up transformer, its (semiconductor) switch is switched to open (current-blocking) or at least its pulse width factor (pulse-pause ratio, duty cycle) is decreased. In this way, the first energy store, as long as it has a voltage greater than the voltage threshold, is discharged via the voltage converter until the voltage provided by the first energy store has reached the threshold value.

In particular, due to the up-conversion of this voltage by the voltage converter and by the improved energy transmission due to impedance matching, the voltage applied to the second energy store, or provided thereby, reaches a height fairly quickly that is sufficient for the operation of the electrical load even at low engine speeds at start-up.

Further, it is provided that the voltage threshold is set as a function of the (engine) speed. In other words, adjustment or control of the voltage value of the first energy store is load-dependent. For example, a starter wheel is rigidly coupled to a crankshaft of the combustion engine so that the engine speed corresponds to the speed of the starter wheel. To determine the engine speed, in this case, for example, a length of time between the peak values of the induced charging voltage is used, wherein the length of time represents the engine speed, or the speed can be determined based on this length of time. For example, the speed is determined by means of the length of time between directly consecutive peak values. Alternatively, the speed is determined, for example, by means of the length of time between, for example, positive half waves (peak values) of the induced charging voltage, which are each assigned to the magnetic position sensor.

Further, alternatively, the engine speed of the internal combustion engine can be measured or determined by means of a speed sensor. In this case, the speed sensor is embodied, for example, as a Hall sensor. The voltage threshold is then set as a function of the engine speed thus measured or determined.

The impedance of the charging coil and the circuit comprising the first energy store is in particular of a frequency at which the first energy store is charged, and thus contingent on the engine speed. The impedance increases in particular with increasing speed. In order to align the input impedance of the voltage converter and the impedance of the circuit comprising the charging coil and the first energy store, the voltage threshold increases, in particular with increasing engine speed or with decreasing duration, so that the voltage provided by the first energy store is not undershot and the impedance of the circuit comprising the charging coil and the first energy store is changed accordingly. In other words, in particular, the voltage threshold is increased with the increasing (engine) speed of the combustion engine. For example, the voltage threshold value associated with an engine speed is deposited in a table or is determined by a previously known function. In this case, the table or the previously known function is in particular determined by means of a series of measurements. Thus, with speed increasing over time, the voltage value which is not undershot in the course of discharging the first energy store increases at the first energy store.

The energy value (energy, amount of energy) provided by the second energy store, in particular for an electrical load, can be measured. If the second energy store is, for example, a capacitor, the amount of energy stored in it can be recorded by measuring the capacitor voltage $U_c$. The relation $E = \frac{1}{2} C U_c^2$ applies to the amount of energy stored in the capacitor, wherein C is the (selected) capacitance of the capacitor.

When the recorded energy value exceeds a threshold value, an electrical load is energized. In this case, the threshold value is set or stored on the control unit, which accordingly switches (on) the electrical consumption as a function of the recorded energy value. Expediently, the threshold value further is sufficiently high to be able to safely operate an electrical load, in particular when starting the combustion engine.

In other words, the second energy store is charged via the voltage converter from the first energy store until enough energy is stored in the second energy store so as to be able to start the electrical load.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
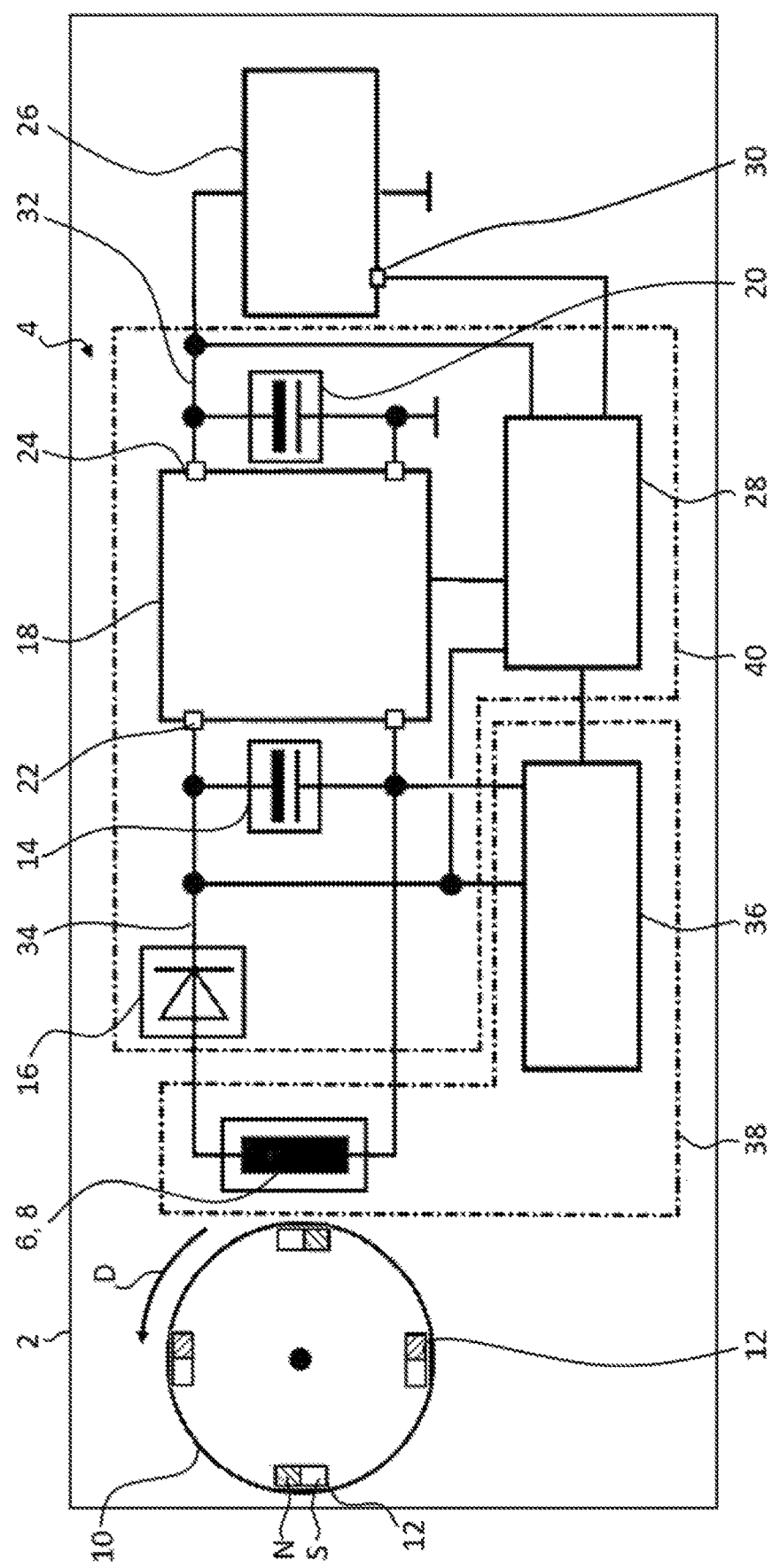
FIG. 1 illustrates a block diagram of an internal combustion engine with a starter wheel and with an ignition device, which comprises a charging coil arranged on a yoke core and a first energy store and a second energy store connected thereto via a voltage converter, wherein an electrical load is connected to the second energy store.

FIG. 1 shows an internal combustion engine 2 with an ignition device 4. A method B for its operation is shown as a flow chart in FIG. 4. The ignition device has a charging coil 6 which is arranged on a yoke core 8 designed as an iron core. Furthermore, the internal combustion engine 2 has a starter wheel 10 which is rotatable in a direction of rotation D, which in this case is a flywheel with four magnets 12. At a rotation of the starter wheel 10, the magnets 12 of the starter wheel 10 are moved past the charging coil 6 so that a charging voltage $U_L$ is induced in the charging coil 6, which has temporally consecutive positive and negative half waves.

Further, one of the magnets 12, hereinafter referred to as a magnetic position sensor, is arranged such that upon rotation of the starter wheel in the direction of rotation D, first its north pole N is moved past the charging coil 6, and then its south pole S. The other magnets 12 are oppositely arranged, i.e., at a a rotation of the starter wheel 10 in the direction of rotation D, first its south pole S and then its north pole N are moved past the charging coil 6. In other words, the magnet position sensor 12 has a polarity that is opposite (reversed) to the other magnet 12 with respect to the direction of rotation D.

Furthermore, the ignition device 4 comprises a first energy store 14, which here is a first capacitor. The latter is connected to the charging coil. In this case, a rectifier 16 formed as a diode is connected between the first energy store 14 and the charging coil, such that the capacitor is charged by means of the induced charging voltage $U_L$, which has positive and negative half waves (method step charging LE of the first energy store, FIG. 4).

The first energy store 14 is connected to a second energy store 20 via a voltage converter 18, wherein the voltage converter 18 is an up-converter and the second energy store 20 is a second capacitor. In summary, the first energy store 14 is connected to an input 22 of the voltage converter 18, i.e., to the input side, and the second energy store 20 connected to its output 24, that is, on the output side. Thus, the second energy store 20 is charged via the voltage converter 18 from the first energy store 20 (method step charging LZ of the second energy store, FIG. 4).

In addition, an electrical load 26 is connected to the second energy store 20 for purposes of its power supply. The electrical load 26 has an energy requirement for its operation which in particular cannot be provided by the first energy store 14. The electrical load 26 here is a fuel-injection valve.

The ignition device 4 comprises a control unit 28, which is connected to a control input 30 of the electrical load 26. The control unit 28 is further connected to a first current path 32 which extends between the second energy store 20 and the electrical load 26. Thus, the (energy, amount of energy) energy value E stored in the second energy store 20 which is designed as a capacitor can be calculated by means of the capacitor voltage $U_c$ applied thereto.

In addition, the control unit 28 is connected to a second current path 34 extending between the charging coil 6 and the first energy store 14. This way, the charging voltage $U_L$, and thus the voltage $U_{14}$ provided by the first energy store 14, is measured by the control unit 28. The control unit 28 is further connected to the up-converter 18. Thus, it is possible that the second energy store 20 is charged via the voltage converter 18 as a function of the voltage $U_{14}$ provided by the first energy store 14. This way, the transmission of the energy which corresponds to the induction having taken place in the charging coil 6 to the second energy store 20 is improved.

The ignition device 4 comprises a voltage limiter 36 (for voltage limitation). This is connected between the charging coil 6 and the first energy store 14. By means of this, the induced charging voltage $U_L$, which is supplied to the input side of the first energy store 14 is limited at the first energy store 14, thus preventing damage thereto. The voltage limiter 36 is connected to the control unit 28. This way, the voltage limiter 36, designed for example as a voltage actuator circuit or voltage regulator circuit, can be controlled or regulated accordingly.

Furthermore, it can be seen in FIG. 1 that the ignition device 4 has a first module 38 and a second module 40, which are each shown as a dot-dashed frame. The two modules 38 and 40 are separated from each other, in other words are not formed contiguous. In the first module 38, both the charging coil 6 and the voltage limiter 36 are arranged. In the second module 40, the rectifier 16, the first energy store 14, the second energy store 20, the up-converter 18 and the control unit 28 are arranged.

Figure 2:
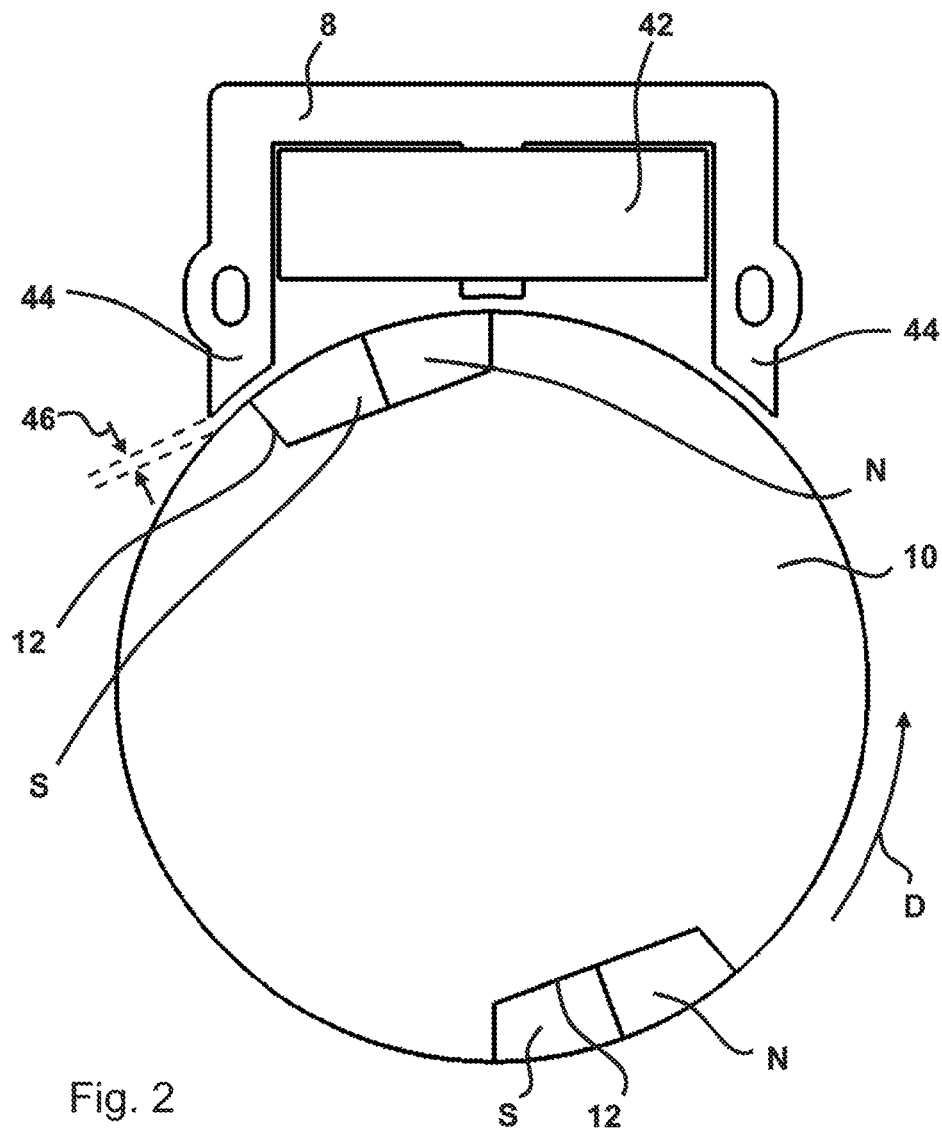
FIG. 2 illustrates the internal combustion engine, wherein the starter wheel is designed as a flywheel with magnets.

FIG. 2 shows a first variation of the internal combustion engine 2. This has a single module 42 which is arranged on the yoke core 8. In the module 42, the charging coil 6, the rectifier 16, the first energy store 14, the second energy store 20, the voltage converter 18, the control unit 28, the electrical load 26 and the voltage limiter 36 are arranged.

The yoke core 8 is E-shaped, wherein the E-legs 44 extend out from the starter wheel 10 under formation of an air gap 46. In this case, the starter wheel 10 embodied as a flywheel has two magnets 12, of which the polarity is opposite (reversed) in the direction of rotation D. The middle E-leg is covered by the module 42.

Figure 3:
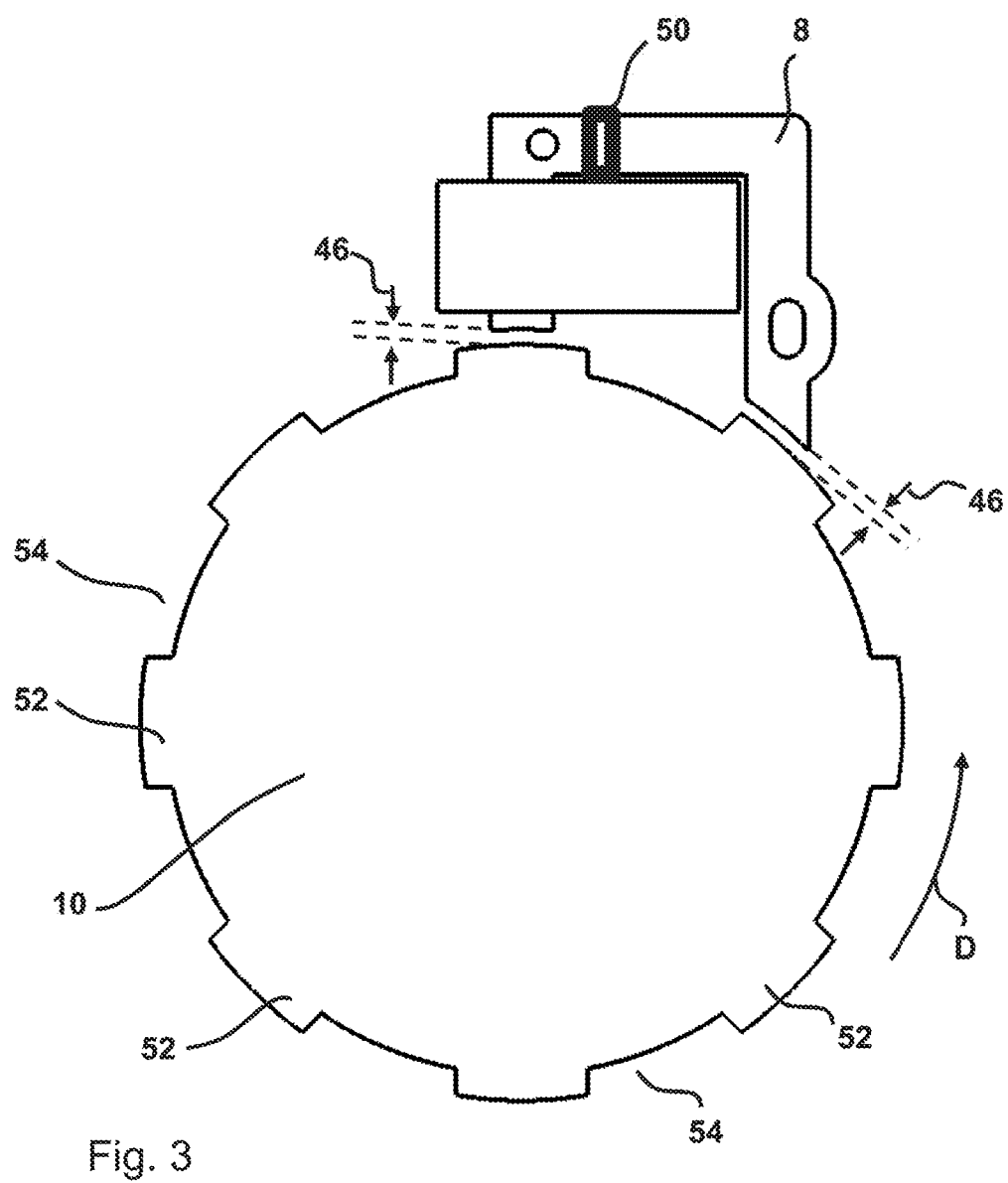
FIG. 3 illustrates the internal combustion engine, wherein the starter wheel is formed as a gear.

FIG. 3 shows an alternative embodiment of the internal combustion engine 2. Here, the yoke core 8 is formed substantially U-shaped, wherein the free ends of the thus formed U-legs 48 are facing a starter wheel 10, embodied here as a gear. In this case, the air gap 46 is formed between the U-legs 48 of the yoke core 8 and the gear.

In this embodiment, a magnet 50 is integrated in or arranged on the yoke core 8. Upon rotation of the gear, a tooth 52 of the gear is moved past the U-legs 48 of the yoke core 8, so that when in each case one of the teeth 52 is aligned with a U-leg 48, the magnetic circuit is closed via the air gap 46 and the gear. However, if the U-legs 48 of the yoke core 8 are facing (oppose) a gap 54 formed between the teeth 52 of the gear, the magnetic circuit is interrupted due to the then comparatively large air gap 46. Upon rotation of the gear, on the basis of the above, the magnetic flux through the charging coil 6 is changed, such that the charging voltage $U_L$ is induced.

Figure 4:
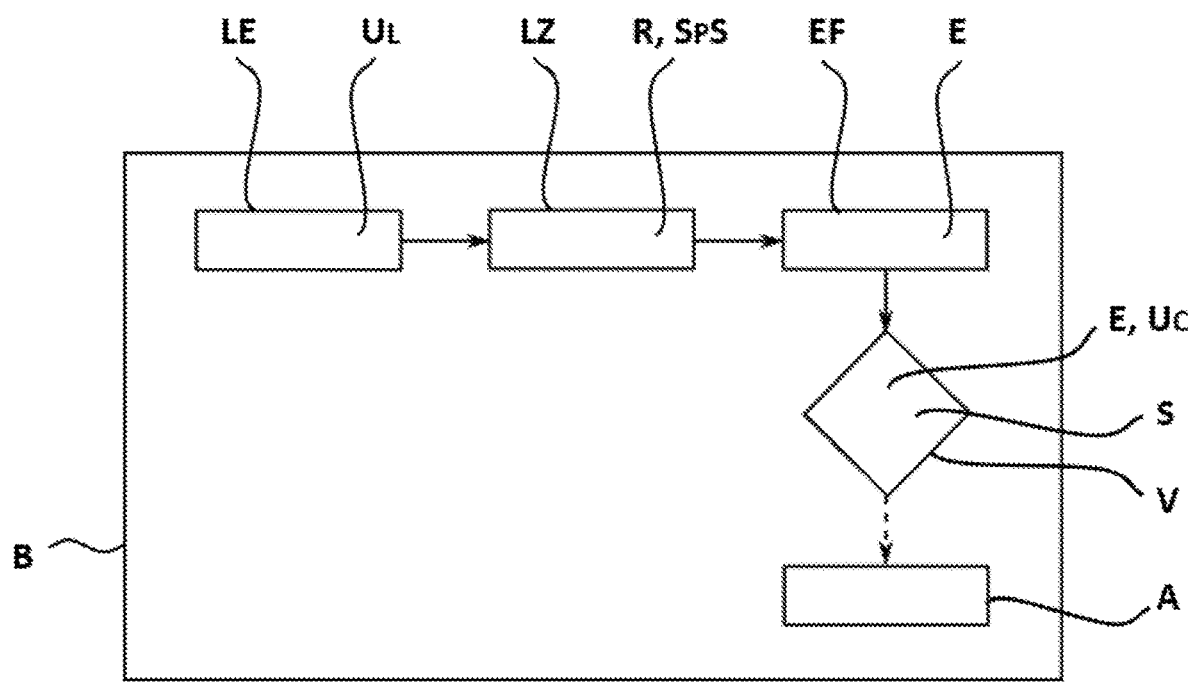
FIG. 4 is a flow diagram, a method sequence for operating the internal combustion engine having the ignition device, wherein the second energy store is charged as a function of a voltage provided by the first energy store.

FIG. 4 schematically shows in a flow chart a method for operating the internal combustion engine 2. In this case, in a first step referred to as charging LZ, the first energy store 14 is charged by means of the charging voltage $U_L$ induced in the charging coil 6. Furthermore, according to the method, the second energy store 20 is charged via the voltage converter 18 in the method step LZ.

In this case, this charging step LZ is carried out as a function of the voltage $U_{14}$ provided by the first energy store 14. For this purpose, the voltage $U_{14}$ provided by the first energy store 14 is measured by means of the control unit 28. The measured voltage $U_{14}$ is compared with a voltage threshold value SpS, and the charging of the second energy store 20 is suspended when or as long as the measured voltage ($U_{14}$) falls below the voltage threshold value SpS. The control unit 28 is also used for this comparison. If the voltage $U_{14}$ falls below the voltage threshold value SpS, the control unit 28 switches the voltage converter 18 to a locked state. For this purpose, a semiconductor switch 18 of the voltage converter 18 embodied as an up-converter is switched to current-blocking.

The voltage threshold value is dependent on an (engine) speed R. In this case, in a table stored in the control unit 28, a value of the engine speed R is in each case assigned an amount of the voltage threshold value SpS or is determined by interpolation based on said table.

The impedance of the circuit comprising the charging coil 6 and the first energy store 16 is particularly dependent on a frequency at which the first energy store 16 is charged, and thus dependent on the engine speed R. Further, due to the voltage threshold value SpS which is dependent on the speed R, the first energy store 16 is discharged during the loading of the second energy store 20 in such a way that the voltage $U_{14}$ provided thereon does not fall below the voltage threshold SpS. As a result, the impedance of the circuit comprising the charging coil 6 and the first energy store 16 is changed in accordance with the voltage threshold SpS. Thus, this impedance is matched to an (input) impedance of the voltage converter 18 even with changing rotational speeds R. Consequently, power or energy transmission from the charging coil 6 to the second energy store 20 is improved.

In an embodiment of the combustion engine of FIG. 1, the engine speed R is determined by means of a speed sensor designed as a Hall sensor. Alternatively, the engine speed is calculated based on a length of time Δt between peak values M (FIG. 5a) of the charging voltage $U_L$ induced in the charging coil 6, for example based on a length of time Δt between successive maximums M.

In a further step EF, by means of the control unit 28, the (energy, energy amount) energy value E stored in the second energy store 20 embodied as a capacitor is determined by means of the capacitor voltage $U_c$ applied thereto. The control unit 28 switches or activates the electrical load 26 in the method step designated activation A when the capacitor voltage $U_c$ or the stored energy value E provided to the electrical load 26 exceeds a threshold value S. This is shown in FIG. 4 as the method step "comparison V". The dashed arrow illustrates that the activation A takes place only when the threshold value S is exceeded by the energy value E. In this case, the threshold value S is stored or set in the control unit 28. In this way, the electrical load 26 with a comparatively high energy demand is activated only if sufficient energy is available in the second energy store 20 for the operation of said electrical load 26.

Figure 5A:
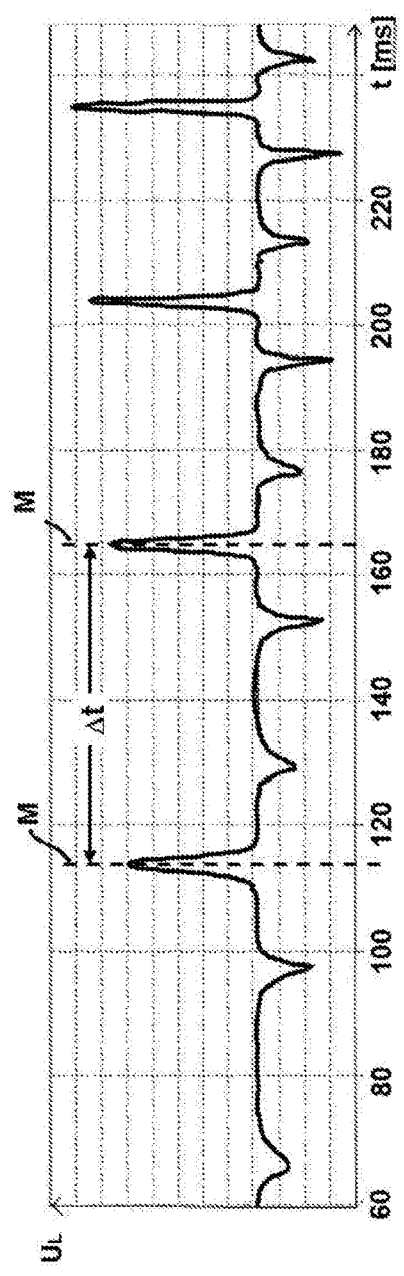
FIG. 5a illustrates a chronological progression of the charging voltage induced in the charging coil of the ignition device.

FIG. 5a illustrates a chronological progression of the induced charging voltage $U_L$. At a known rotational speed, a progression of the charging voltage $U_L$ can be determined analogously to an angular position. The charging voltage $U_L$ has a sequence of positive and negative half waves. Their maxima or minima (extreme values, peak values) M correlate with certain angular positions of the starter wheel 10 designed as a flywheel. Here, the (engine) speed R increases with time, resulting in decreasing lengths of time Δt between successive maxima M. The internal combustion engine 2 here is formed according to FIG. 1, wherein all the magnets 12 have the same polarity with respect to the direction of rotation D. For the sake of clarity, only two successive maxima M are provided with the reference numeral in FIG. 5a and the length of time Δt between these two maxima is illustrated.

Figure 5B:
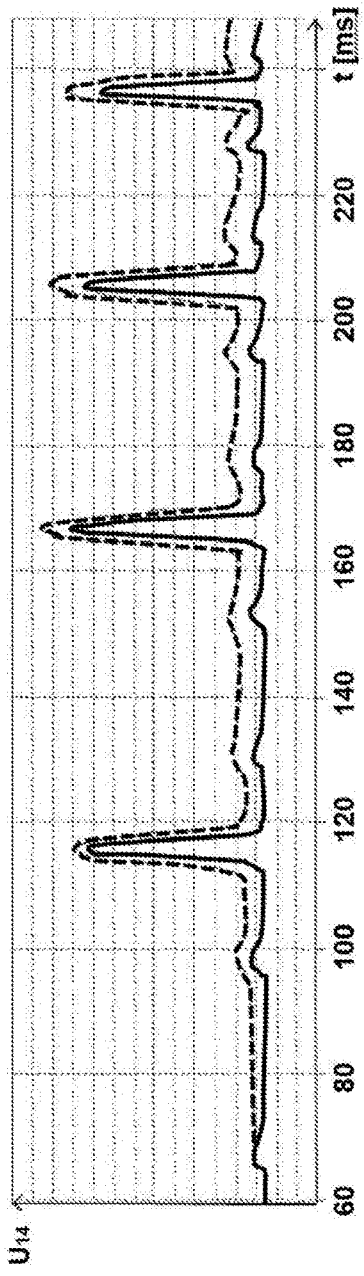
FIG. 5b illustrates chronological progressions of the voltage provided by the first energy store when charging the second energy store, which is dependent on said voltage, or when charging the second energy store without this dependence, wherein the first energy store is charged by means of the charging voltage with a chronological progression according to FIG. 5a, and FIG. 5c illustrates chronological progressions of the capacitor voltage applied at the second energy store that is formed as a capacitor, as a function of the charging of the second energy store of the voltage provided by the first energy store or when charging the second energy store without this dependence.

FIG. 5b shows two chronological progressions of the voltage $U_{14}$ provided by the first energy store 16. The first energy store 16 is charged via the rectifier 16 by means of the charging voltage $U_L$ with a chronological progression as shown in FIG. 5a. The progression shown in dashed lines represents the chronological progression of the voltage $U_{14}$ in which the second energy store 20 is charged as a function of this voltage $U_{14}$ shown above. This is referred to below as a dependent charging process. Thus, the second energy store 20 is only charged via the voltage converter 18 if the voltage $U_{14}$ is greater than the (engine) speed-dependent voltage threshold SpS.

The other progression illustrated by a solid line represents the voltage $U_{14}$ when charging the second energy store 20 without such a dependency (independent charging process). The voltage threshold SpS and the charging (charging behavior) of the second energy store 20 dependent thereupon, and accordingly the discharging (discharging behavior) of the first energy store 16, causes the voltage $U_{14}$ provided by the first energy store 16, when the second energy store 20 has been dependently charged or the first energy store 16 has been dependently discharged, to always be higher than when the second energy store 20 is charged or the first energy store 16 is discharged without this dependency.

Due to the impedance matching carried out by means of the dependence of the charging of the second energy store 20 of the voltage $U_{14}$, between the circuit comprising the charging coil 6 and the first energy store 16 and the voltage converter 18, energy transmission or power transmission via the voltage converter 18 from the circuit comprising the charging coil 6 and the first energy store 16 to the second energy store 20 is improved.

Figure 5C:
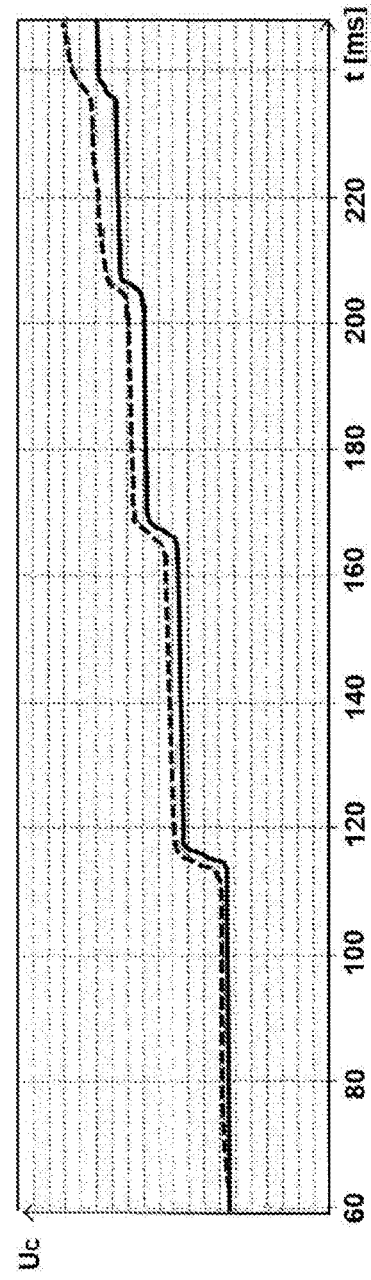

Thus, in the dependent charging process, the capacitor voltage $U_c$ increases faster than in independent charging. The chronological progression shown in dashed lines in FIG. 5c shows, analogously to FIG. 5b, the capacitor voltage $U_c$ with the dependency described above. The other chronological progression shown with a solid line represents the capacitor voltage $U_c$ of the second energy store 20 in the independent charging process. In this case, at any time the capacitor voltage $U_c$ is greater in the dependent charging than in the independent charging process, so that the electric load 26 is advantageously put into operation more quickly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An ignition device for an internal combustion engine, the ignition device comprising:
   a charging coil disposed on a yoke core to provide a charging voltage induced as a result of a rotational movement of a starter wheel;
   a first energy store connected via a rectifier to the charging coil; and
   an electrical load connected to a second energy store for energy supply during a starting operation of the internal combustion engine, the second energy store being connected via a voltage converter to the first energy store such that a first voltage at an input of the second energy store is greater than a second voltage output by the first energy store.

2. The ignition device according to claim 1, wherein the voltage converter is an up-converter, the first energy store being connected to the voltage converter at an input of the voltage converter, and the second energy store being connected to an output of the voltage converter.

3. The ignition device according to claim 1, further comprising a control unit that measures a voltage provided by the first energy store and/or is connected to a control input of the electrical load and measures an energy value provided by the second energy store.

4. The ignition device according to claim 1, wherein the first energy store and/or the second energy store is a capacitor.

5. The ignition device according to claim 1, wherein a voltage limiter is connected between the charging coil and the first energy store.

6. The ignition device according to claim 5, wherein the charging coil and the voltage limiter are arranged in a first module, and wherein at least the first energy store or the first and the second energy store, the rectifier, the voltage converter and/or the control unit are arranged in a second module separated from the first module.

7. A method for operating an internal combustion engine with an ignition device, the method comprising:
   charging a first energy store via a charging voltage induced in a charging coil via a rectifier;
   measuring an output voltage provided by the first energy store; and
   charging a second energy store, connected to the first energy store via a voltage converter, as a function of the output voltage provided by the first energy store such that a first voltage at an input of the second energy store is greater than the output voltage of the first energy store.

8. The method according to claim 7, wherein the output voltage provided by the first energy store is compared with a voltage threshold, wherein the charging of the second energy store via the voltage converter is suspended as long as the measured voltage falls below the voltage threshold.

9. The method according to claim 8, wherein the voltage threshold is set as a function of an engine speed of the internal combustion engine.

10. The method according to claim 7, further comprising:
measuring an energy value provided by the second energy store, and wherein an electrical load is energized for operating or starting the internal combustion engine when the measured energy value exceeds a threshold value.

11. An internal combustion engine comprising an ignition device according to claim 1, where the starter wheel is a flywheel having at least two magnets that induce the charging voltage in the charging coil during a rotational movement.

12. The internal combustion engine according to claim 11, wherein a polarity of one of the magnets of the flywheel is oriented in a direction of rotation of the flywheel and the polarity of the other magnets of the flywheel is oriented counter to the direction of rotation.

13. The method of claim 8, wherein an impedance of a circuit formed from the charging coil and the first energy store is set in accordance with the voltage threshold.

14. The ignition device according to claim 1, wherein the second voltage output from the first energy store is compared with a voltage threshold, wherein the second energy store is charged by the first energy store via the voltage converter, the charging being suspended as long as the second voltage is below the voltage threshold.

15. The ignition device according to claim 1, wherein the second voltage of the first energy store outputs to the voltage converter, the voltage converter increasing the second voltage to an increased voltage and applying the increased voltage to the second energy store.

16. The ignition device according to claim 15, wherein an impedance of a circuit formed from the charging coil and the first energy store is set in accordance with the voltage threshold.

17. The method according to claim 7, wherein the output voltage of the first energy store outputs to the voltage converter, the voltage converter increasing the output voltage to an increased voltage and applying the increased voltage to the second energy store.

* * * * *